United States Patent
Iwasaki et al.

(10) Patent No.: US 10,137,782 B2
(45) Date of Patent: Nov. 27, 2018

(54) VEHICULAR POWER DISTRIBUTION SYSTEM

(71) Applicant: Yazaki Corporation, Tokyo (JP)

(72) Inventors: Katsuyuki Iwasaki, Makinohara (JP); Hideaki Masui, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 289 days.

(21) Appl. No.: 14/835,014

(22) Filed: Aug. 25, 2015

(65) Prior Publication Data

US 2016/0059708 A1 Mar. 3, 2016

(30) Foreign Application Priority Data

Aug. 26, 2014 (JP) .................................. 2014-171678

(51) Int. Cl.
| | |
|---|---|
| B60L 11/02 | (2006.01) |
| H02M 3/04 | (2006.01) |
| B60L 11/18 | (2006.01) |
| B60L 1/00 | (2006.01) |

(52) U.S. Cl.
CPC ...................... *B60L 1/00* (2013.01)

(58) Field of Classification Search
CPC .... B60L 1/00; B60L 1/04; B60L 1/08; H02M 3/04
See application file for complete search history.

(56) References Cited

U.S. PATENT DOCUMENTS

| | | | | |
|---|---|---|---|---|
| 5,818,673 | A | * 10/1998 | Matsumaru | H02J 1/06 361/63 |
| 6,340,848 | B1 | * 1/2002 | Maeda | H02J 1/00 307/10.1 |
| 2003/0030328 | A1 | 2/2003 | Tamai et al. | |

(Continued)

FOREIGN PATENT DOCUMENTS

| | | |
|---|---|---|
| CN | 203651668 U | 6/2014 |
| EP | 1281581 A1 | 2/2003 |
| JP | 10-173687 A | 6/1998 |

(Continued)

OTHER PUBLICATIONS

Communication dated Jan. 12, 2018, issued by the State Intellectual Property Office of the People's Republic of China in counterpart Chinese Patent Application No. 201510531044.1.

(Continued)

*Primary Examiner* — Rexford Barnie
*Assistant Examiner* — Terrence Willoughby
(74) *Attorney, Agent, or Firm* — Sughrue Mion, PLLC (57) ABSTRACT

A vehicular power distribution system includes a first and second power control boxes which are configured to distribute the power, and a main connection cable which electrically connects the first power control box and the second power control box. At least the second power control box includes at least one voltage converter which generates output power of second voltage from input power of first voltage determined in advance. A number of kinds of voltage of power passing the main connection cable is smaller than each of a number of kinds of voltage outputted from the first power control box and a number of kinds of voltage outputted from the second power control box.

2 Claims, 3 Drawing Sheets

(56) References Cited

U.S. PATENT DOCUMENTS

2011/0115287 A1    5/2011  Morita et al.

FOREIGN PATENT DOCUMENTS

| JP | 2000-318545 A | 11/2000 |
| --- | --- | --- |
| JP | 2003-152762 A | 5/2003 |
| JP | 2003-309565 A | 10/2003 |
| JP | 2004056944 A | 2/2004 |
| JP | 2006-248265 A | 9/2006 |
| JP | 2008049982 A | 3/2008 |
| JP | 2011105205 A | 6/2011 |
| JP | 2011213321 A | 10/2011 |
| JP | 2012076630 A | 4/2012 |
| JP | 2013166513 A | 8/2013 |

OTHER PUBLICATIONS

Communication dated Aug. 14, 2017, issued by the Japanese Patent Office in counterpart Japanese Patent Application No. 2014-171678.
Communication dated May 31, 2017, from the State Intellectual Property Office of People's Republic of China in counterpart Application No. 201510531044.1.
Communication dated Aug. 28, 2018, issued by the State Intellectual Property Office of P.R. China in counterpart Chinese Application No. 201510531044.1.

\* cited by examiner

VEHICULAR POWER DISTRIBUTION SYSTEM

BACKGROUND

The present invention relates to a vehicular power distribution system which distributes power from a main power source to a plurality of systems in a vehicle and then supplies the power, thus distributed to the plurality of systems, to respective electric devices via predetermined wire harnesses.

In a vehicle, various electric devices are disposed in a dispersed manner at various portions in a vehicle body. For example, electric devices relating to running of a vehicle, electric devices relating to an audio system, electric devices relating to functions of the vehicle body and so on are disposed at various portions such as a steering column, a glove box, a center cluster and a center console. Usually, each of such the electric devices mounts various switches, various sensors, various loads, control relays and so on.

Such the various electric devices are required to be supplied with power from a main power supply (an on-vehicle battery or an alternator) on the vehicle side. Further, signals from the switches and the sensors provided in some of the electric devices are required to be transmitted to others of the electric devices and various electronic control units (ECUs) provided in the vehicle.

To this end, conventionally, the power source on the vehicle side is connected to the various electric devices and the various electronic control units via wire harnesses. In general, each of such the wire harnesses is configured by binding many wires. Further, a length of each of the wires is adjusted and a shape of each of the wire harnesses is determined in accordance with positional relations of the electric devices so that the devices disposed at respective portions can be mutually connected surely. Further, a thickness of each of the wires for power supply constituting each of the wire harnesses is determined depending on a magnitude of power consumed by a load of corresponding one of the electric devices. Furthermore, a connector is coupled to an end portion of each of wire bundles constituting the wire harness so that the wire harness can be electrically and detachably connected to corresponding electric devices with ease.

Recently, in most cases, many electronic control units (ECUs) are mounted at various portions in a vehicle. Thus, the many electronic control units are required to be connected via communication lines contained in wire harnesses so that the many electronic control units can communicate to each other. In this case, if the number of the electronic control units etc. mounted in a vehicle increases, a size of each of the wire harnesses becomes large. As a result, it becomes difficult to secure a space for disposing the wire harnesses and further a weight of the wire harnesses increases.

In a vehicular power distribution system disclosed in a patent literature 1, a plurality of electric connection boxes are provided in order to distribute power of a power source. Each of the electric connection boxes contains many fuses and relays.

In an on-vehicle system disclosed in a patent literature 2, when a supply side of power of a power source receives a power supply request to a load, propriety of the power supply is determined based on a state of the power source and a power supply amount to the load. By doing so, a residual amount of the power source can be prevented from reducing below a minimum required value.

In a power source circuit for a vehicle disclosed in a patent literature 3, a power line is separated into a plurality of systems based on characteristics of a plurality of loads connected thereto, and a noise protection circuit is commonly provided for each the system.

In a power supplying device for a vehicle disclosed in a patent literature 4, a shutdown circuit and an inrush current limiting circuit are provided between a power supplying side and each of loads (ECU).

In an electronic control system for a vehicle disclosed in a patent literature 5, a plurality of shared I/O units are connected to a single electronic control device via communication lines and power source lines, and a non-shared I/O unit is connected to the electronic control device as needed. Further, the single electronic control device mounts control softwares for all electric devices.

In a power source circuit for a vehicle and an electric connection box for a vehicle disclosed in a patent literature 6, a noise filter is connected to each of power lines connecting between a power source and respective loads.

[Patent Literature 1] JP-A-2004-56944
[Patent Literature 2] JP-A-2008-49982
[Patent Literature 3] JP-A-2011-105205
[Patent Literature 4] JP-A-2011-213321
[Patent Literature 5] JP-A-2012-76630
[Patent Literature 6] JP-A-2013-166513

SUMMARY

An object of the present invention is to provide a vehicular power distribution system which enables to supply powers of a power source with more suitable voltages to respective various kinds of loads from a power source unit in the vehicle and also to suppress enlargement of a wire harness.

According to one advantageous aspect of the invention, there is provided a vehicular power distribution system which distributes power from a power source to a plurality of systems in a vehicle and then supplies the powers, thus distributed to the plurality of systems, to respective electric devices via predetermined wire harnesses, is configured by including:

a first power control box which is configured to distribute the power; a second power control box which is configured to distribute the power; and a main connection cable which electrically connects the first power control box and the second power control box, wherein at least the second power control box includes at least one voltage converter which generates output power of second voltage from input power of first voltage determined in advance, and a number of kinds of voltage of power passing the main connection cable is smaller than each of a number of kinds of voltage outputted from the first power control box and a number of kinds of voltage outputted from the second power control box.

The first power control box may supply the power of first voltage to the main connection cable, and the second power control box may receive the power of first voltage from the main connection cable and generates the output power of second voltage from the voltage converter based on the power of first voltage.

The second power control box may include, as the voltage converter, at least one DC/DC converter which generates the second voltage from the first voltage, and the second voltage may be lower than the first voltage.

The second power control box may include, as the voltage converter, at least one DC/DC converter which generates the second voltage from the first voltage, and the second voltage may be higher than the first voltage.

The main connection cable may include a data communication line for transmitting information between the first power control box and the second power control box, and a control unit provided in one of the first and second power control boxes may control a state of the other of the first and second power control boxes via the data communication line.

DETAILED DESCRIPTION OF EXEMPLIFIED EMBODIMENTS

In recent years, as various kinds of electric devices are connected as loads of a power source in a vehicle, the power source on the vehicle side is desired to supply power of voltage suitable to characteristics of the load for each of the loads in order to avoid excessive power consumption.

For example, as many of electric devices mounted in a general vehicle are operated by power source voltage of 12[V], the power source desirably supplies power of 12[V]. As to an electric device requiring a large power consumption, a high voltage of, for example, about 48[V] is supplied thereto. By doing so, as an amount of current can be reduced, power loss on a wiring such as a wire harness connected to this electric device can be reduced. An electronic control unit (ECU) mounting a microcomputer, a logic circuit and so on therein is generally designed so as to be operated by a low power source voltage of about 5[V], the power source on the vehicle side desirably supplies power of 5[V] to the ECU.

However, in order to supply power of different voltages for plural systems to respective loads, many wires more than the number of kinds of voltage are required to be incorporated in a wire harness. As a result, as the number of the wires constituting the wire harness increases, an outer diameter of the wire harness becomes large and a weight of the wire harness also increases.

In particular, in a case of supplying low voltage of about 5[V] to a load, a current flowing through a wire of a wire harness becomes twice or more as compared with a current in a case of supplying voltage of 12[V] to the load even if an amount of power consumption of the load is same. Thus, in order to reduce an amount of voltage drop in this wire of the wire harness, a wire having a thicker diameter is required to be employed as this wire. As a result, an enlargement of the wire harness is inevitable.

In a case of providing a plurality of electric connection boxes like the vehicular power distribution system of the patent literature 1, as a large current is required to be flown through a trunk line of a wire harness connecting between the electric connection boxes, a wire of a large diameter is inevitably employed as the trunk line.

The invention, having been contrived bearing in mind the heretofore described circumstances, has for its object to provide a vehicular power distribution system which enables to supply powers of a power source with more suitable voltages to respective various kinds of loads from a power source unit in the vehicle and also to suppress enlargement of a wire harness.

A vehicular power distribution system according to an embodiment of the invention will be explained with reference to accompanying drawings.

<Explanation of Configuration>
<Example of Configuration of Electric System of Entire Vehicle>

Figure 4:
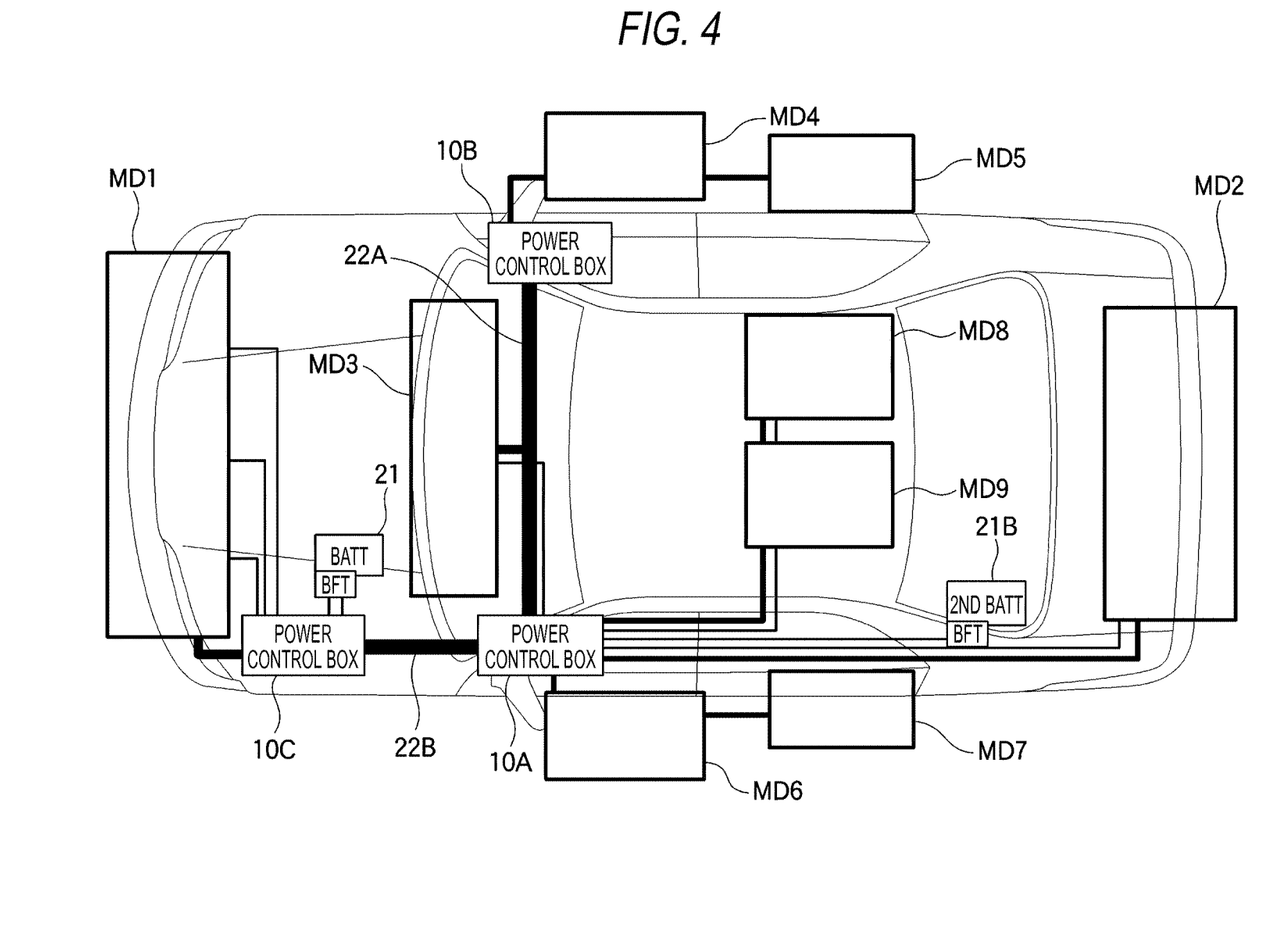
FIG. 4 is a diagram showing a concrete example of a positional relation among various kinds of loads, the main power control box and the sub-power control boxes in a vehicle.

FIG. 4 shows a concrete example of a positional relation among various kinds of loads, a main power control box and sub-power control boxes in a vehicle. FIG. 4 shows the positional relation of constituent elements on a horizontal plane when a vehicle body is seen from an upper side.

Various electric devices are disposed at various portions in the vehicle. These electric devices are connected as loads, under control of a power source unit, to the power source unit provided on the vehicle side. Many loads disposed in the vehicle are collectively grouped for each region as plural modules in consideration of the easiness of connection and control of these loads.

In the example shown in FIG. 4, load modules MD1 to MD9 are mounted in the vehicle. The load module MD1 is an assembly of many loads disposed in the vicinity of a front region of the vehicle body and includes various kinds of lamps, solid state relays, an electric motor and so on. Various loads can be connected to the respective solid state relays under control thereof.

The load module MD2 is an assembly of many loads disposed in the vicinity of a rear region of the vehicle body and includes various kinds of lamps, solid state relays, an electric motor and so on. The load module MD3 is an assembly of many loads disposed in the vicinity of a dashboard of the vehicle body and includes various kinds of lamps, solid state relays, an electric motor and so on.

The load module MD4 is an assembly of many loads disposed in the vicinity of a door at a right front side of the vehicle body. The load module MD5 is an assembly of many loads disposed in the vicinity of a door at a right rear side of the vehicle body. The load module MD6 is an assembly of many loads disposed in the vicinity of a door at a left front side of the vehicle body. The load module MD7 is an assembly of many loads disposed in the vicinity of a door at a left rear side of the vehicle body. The load module MD8 is an assembly of many loads disposed in the vicinity of the right side portion of a rear seat of the vehicle body. The load module MD9 is an assembly of many loads disposed in the vicinity of the left side portion of the rear seat of the vehicle body.

Many electronic control units (ECUs) are mounted at respective portions of the vehicle as needed in order to control the various electric devices.

Power is required to be supplied from the power source unit on the vehicle side to each of the electronic control units and each of the loads mounted in the vehicle. Each of the electronic control units is required to control the loads, to input signals from various sensors and switches and to communicate between the ECUs. To this end, the load modules MD1 to MD9, the electronic control units and the power source unit are mutually connected via wire harnesses constituted of many wires. Thus, the wire harnesses contain wires for supplying power of the power source, wires for inputting and outputting signals and wires for performing data communication.

The configuration of the vehicle shown in FIG. 4 includes a main power control box 10A and sub-power control boxes 10B, 100 in order to distribute power from main power sources and supply the distributed powers to each of the electric devices under control. That is, power supplied from the main power source 21 is distributed via at least one of the main power control box 10A and the sub-power control boxes 10B, 10C and supplied to corresponding ones of the loads and the electronic control units. Each of the main power control box 10A and the sub-power control boxes 10B, 100 contains various control functions.

The main power source 21 is constituted of an on-vehicle battery (BATT) or an on-vehicle alternator. The vehicle shown in FIG. 4 also mounts a second battery (2ndBATT) as a main power source 21B of an auxiliary system. Each of the main power control box 10A and the sub-power control boxes 10B, 10C distributes power supplied from the main power sources 21A and 21B and supplies the distributed powers to corresponding ones of the loads and the ECUs.

In the configuration of the vehicle shown in FIG. 4, a trunk cable 22A electrically connects between the main power control box 10A and the sub-power control box 10B. Further, a trunk cable 22B electrically connects between the main power control box 10A and the sub-power control box 10C. Each of the trunk cables 22A and 22B may be configured as a part of the wire harness or provided in the vehicle as a particular trunk line separated from the wire harness.

<Example of Arrangement of Main Constituent Elements of Vehicular power distribution system for Vehicle>

Figure 2:
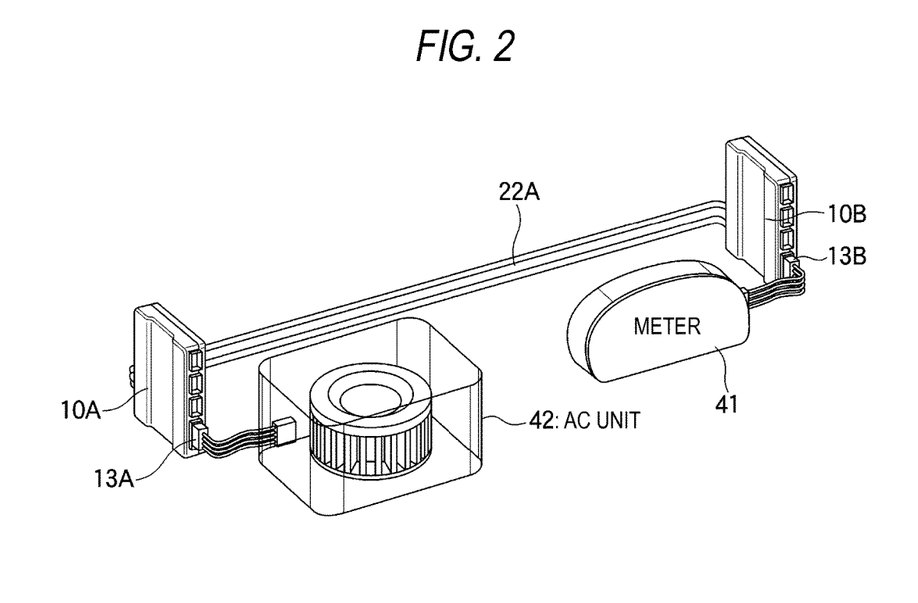
FIG. 2 is a perspective view showing a concrete example of an arrangement of a main power control box, a sub-power control box and a trunk cable.

The vehicular power distribution system according to the invention is constituted of, for example, the main power control box 10A, the sub-power control box 10B and the trunk cable 22A shown in FIG. 4. FIG. 2 shows an external appearance of an example of a concrete arrangement of these constituent elements.

In the example shown in FIG. 2, the main power control box 10A is disposed in the vicinity of the left end of the dashboard of the vehicle and the sub-power control box 10B is disposed in the vicinity of the right end of the dashboard. The trunk cable 22A electrically connects between the main power control box 10A and the sub-power control box 10B.

For example, in a case of vehicles for domestic market, mostly as shown in FIG. 2, a meter unit 41 is disposed at a right side region of the dashboard and an air conditioner (NC) unit 42 is disposed at a left side region of the dashboard. Each of the meter unit 41 and the air conditioner unit 42 contains various loads and various electric control units (ECUs).

Thus, in the constitutional example shown in FIG. 2, an output side connector 13A of the main power control box 10A is connected to the air conditioner unit 42 and an output side connector 13B of the sub-power control box 10B is connected to the meter unit 41. That is, power of the power source is supplied to the air conditioner unit 42 from the main power control box 10A and power of the power source is supplied to the meter unit 41 from the sub-power control box 10B.

In this case, as the air conditioner unit 42 is disposed near the main power control box 10A, wires connecting between these constituent elements can be made short. Further, as the meter unit 41 is disposed near the sub-power control box 10B, wires connecting between these constituent elements can be made short.

In a case where the main power source locates near the main power control box 10A, the output of the main power source is connected to the main power control box 10A to thereby supply power to the main power control box 10A from the main power source. Power of the main power source is supplied to the sub-power control box 10B via the main power control box 10A and the trunk cable 22A. Incidentally, in a case where the main power source locates near the sub-power control box 10B, the output of the main power source may be connected to the sub-power control box 10B.

<Example of Configuration of Trunk Cable 22A>

Figure 3:
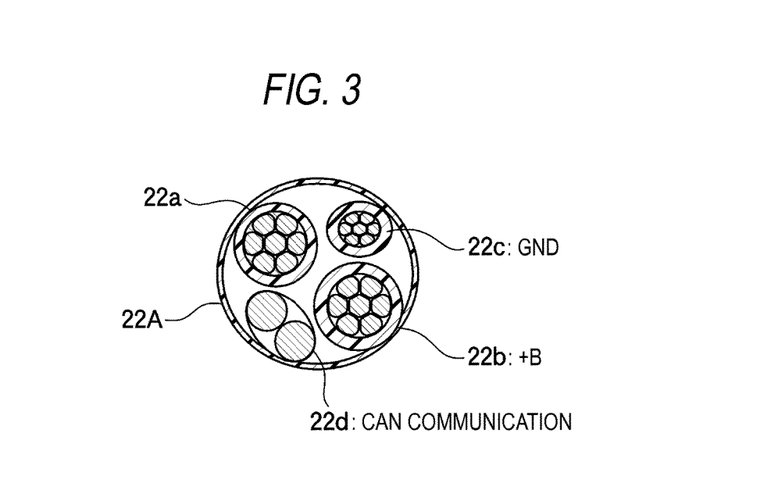
FIG. 3 is a longitudinal sectional diagram showing a concrete example of a sectional structure of the trunk cable.

FIG. 3 shows a concrete example of a sectional configuration of the trunk cable 22A. In the configuration example shown in FIG. 3, the trunk cable 22A is constituted of a +B1 power source line 22a, a +B2 power source line 22b, a ground (GND) line 22c and an inter-wiring communication line 22d.

The +B1 power source line 22a is a single wire (a stranded wire, for example) for feeding a voltage of the power source of, for example, +12[V] or +48[V] and has a sufficient thickness so as to be able to permit passage of a large current. Outer periphery of the +B1 power source line 22a is covered by an insulation coating.

The +B2 power source line 22b is a single wire for feeding power supplied from the main power source 21B of an auxiliary system and has a sufficient thickness like the +B1 power source line 22a. The +B2 power source line 22b is also used to feed a voltage of the power source of, for example, +12[V] or +48[V].

The ground line 22c is a single wire connected to an electrode of the ground level of each of the power sources. The inter-wiring communication line 22d is constituted of two wires and is utilized at a time of performing data communication between the main power control box 10A and the sub-power control box 10B in accordance with a predetermined communication standard (CAN, for example).

<Concrete Configuration of Vehicular power distribution system for Vehicle>

Figure 1:
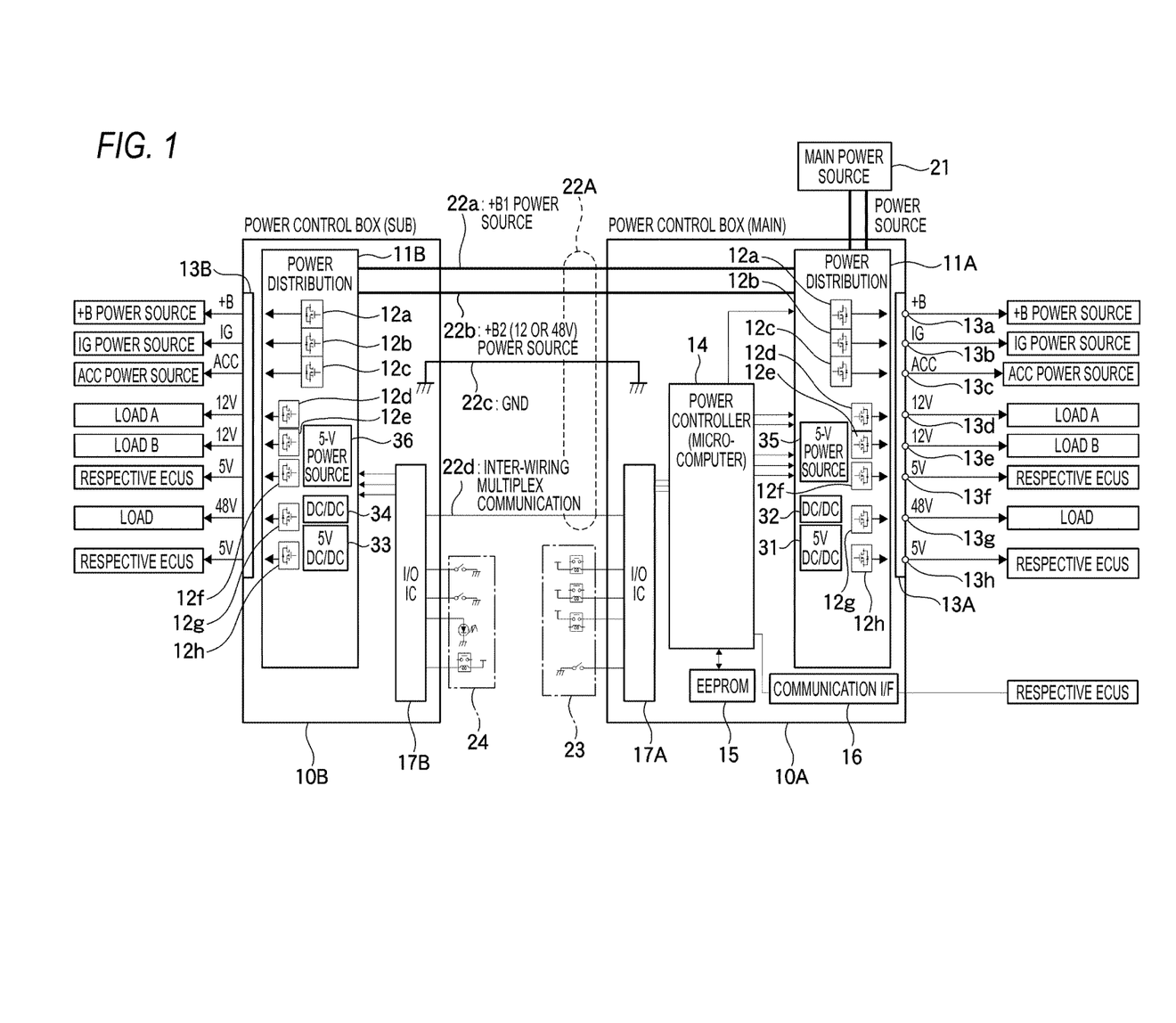
FIG. 1 is a block diagram showing an example of configuration of a vehicular power distribution system according to an embodiment.

FIG. 1 shows an example of concrete configuration of the vehicular power distribution system according to the embodiment. The vehicular power distribution system shown in FIG. 1 includes the main power control box 10A, the sub-power control box 10B and the trunk cable 22A.

Each of the main power control box 10A and the sub-power control box 10B has a basic function of distributing power supplied from the main power source 21 to a plurality of systems and suppling the distributed powers to the various loads, the electronic control units (ECUs) and so on. The main power control box 10A and the sub-power control box 10B are connected via the trunk cable 22A in order to transmit required power and signals therebetween.

As described above, the trunk cable 22A includes the +B1 power source line 22a, the +B2 power source line 22b, the ground line 22c and the inter-wiring communication line 22d. The +B1 power source line 22a is supplied with power of +12[V] or +48[V] from the main power source 21 via the main power control box 10A. The +B2 power source line 22b is supplied with power of +12[V] or +48[V] from the main power source 21B of an auxiliary system via the main power control box 10A.

In the configuration example shown in FIG. 1, the main power control box 10A contains a power distribution circuit 11A, an output side connector 13A, a power source control unit 14, a nonvolatile memory 15, a communication interface (I/F) 16 and an I/O circuit 17A.

The power distribution circuit 11A has a basic function of distributing DC power supplied from the main power source 21 to a necessary number of systems and supplies the distributed powers to the respective output sides.

In order to enable on/off switching of power supply of the distributed powers to respective output systems, the power distribution circuit 11A contains many switching devices 12a to 12h which are connected to the systems in a manner that each of the systems is connected to corresponding one or more of the switching devices. Each of the switching devices 12a to 12h is an intelligent power device (IPD) constituted of a semiconductor circuit and contains various peripheral functions and a protection function. More specifically, each of the switching devices includes a function of detecting a current flowing to the output, a gate driver and so on.

The power distribution circuit 11A further contains DC/DC converters 31, 32 and a 5V power source circuit 35. The DC/DC converter 31 has a function of generating an output power of DC 5[V] from the DC input power of 12 or 48[V]. The DC/DC converter 32 has a function of generating an output power of DC 48[V] from the DC input power of 12 [V] or a function of generating an output power of DC 12[V] from the DC input power of 48 [V]. The 5V power source circuit 35 has a function of stabilizing voltage and can output a stable DC power of 5 [V] with a relatively small current.

In this manner, the power distribution circuit 11A also has the functions of performing the voltage conversion and the voltage stabilization as well as the function of distributing power to the plural systems. Further, the power distribution circuit can monitor an output current for each of the systems using the switching devices 12a to 12h and interrupt the output at the time of occurrence of an abnormality in the corresponding output current.

The main power control box 10A shown in FIG. 1 can output the following powers to respective connection terminals 13a to 13h of the output side connector 13A, as the output powers after the distribution of the power distribution circuit 11A:

13a: a DC power "+B" substantially same as the power outputted from the main power source 21;
13b: a DC power "IG" turned on/off linked with an ignition switch;
13c: a DC power "ACC" turned on/off linked with an accessory switch;
13d: a DC power of 12[V] with a capacity necessary for "load A" as a power source;
13e: a DC power of 12[V] with a capacity necessary for "load B" as a power source;
13f: a stable DC power of 5[V] necessary for an internal circuit of each of the ECUs as a power source;
13g: a DC power of 48[V] necessary for each of the various loads as a power source; and
13h: a stable DC power of 5[V] necessary for an internal circuit of each of the ECUs as a power source.

For example, in a case of being supplied with power of 12[V] from the main power source 21, the DC/DC converter 31 can reduce the supplied voltage and output the DC power of 5[V] to the connection terminal 13h. A power loss at the time of the voltage conversion can be suppressed by employing the DC/DC converter 31. In a case of being supplied with power of 12[V] from the main power source 21, the DC/DC converter 32 can increase the supplied voltage and output the DC power of 48[V] to the connection terminal 13g.

Actually, the various loads and the various electronic control units as shown in FIG. 4 can be connected to the output side connector 13A of the main power control box 10A via the wire harness. In this case, as the main power control box 10A outputs the voltages of 5[V], 12[V] and 48[V], the respective loads can be selectively supplied with suitable voltages.

The power source control unit 14 is configured by hardware mainly constituted of a microcomputer. The microcomputer of the power source control unit 14 executes programs prepared in advance to thereby realize a function necessary for the main power control box 10A and a function necessary for the control of the sub-power control box 10B connected to the main power control box.

The nonvolatile memory 15 is constituted of an EEPROM and holds various data necessary for the control by the power source control unit 14. The data held in the nonvolatile memory 15 can be rewritten as needed.

The communication interface 16 provides a communication function for performing data communication between the power source control unit 14 and the various ECUs connected to the main power control box 10A. The communication interface 16 has a communication function in accordance with the standard, for example, CAN.

The I/O circuit 17A performs a signal processing so that the power source control unit 14 can input and output signals. The I/O circuit 17A is connected to the sub-power control box 10B via the inter-wiring communication line 22d of the trunk cable 22A. Thus, the power source control unit 14 can perform multiplex communication and transmission/reception of various signals with the sub-power control box 10B. Circuits such as switches 23 are connected to the I/O circuit 17A. Thus, the power source control unit 14 can input signals from the switches connected to the I/O circuit 17A and also perform on/off control of relays and so on connected to the I/O circuit 17A.

The microcomputer of the power source control unit 14 executes the predetermined program to control the switching devices 12a to 12h, whereby powers of the power source with predetermined voltages can be supplied to the respective connection terminals 13a to 13h of the output side connector 13A. Further, the power source control unit 14 monitors sense signals from the switching devices 12a to 12h and determines presence or non-presence of an overcurrent for each of the output systems. Thus, when the overcurrent is detected, the power source control unit can interrupt the output to the corresponding output system. Further, the power source control unit 14 can perform data communication with the ECUs and hence can exchange various information therewith. Furthermore, the power source control unit 14 can transmit signals via the I/O circuit 17A and the inter-wiring communication line 22d to thereby remotely control the sub-power control box 10B.

As shown in FIG. 1, the sub-power control box 10B includes a power distribution circuit 11B, an output side connector 13B and an I/O circuit 17B. Inputs of the power distribution circuit 11B are connected to the main power control box 10A via the +B1 power source line 22a and the +B2 power source line 22b of the trunk cable 22A. Thus, powers outputted from the sub-power control box 10B is inputted via the main power control box 10A and the trunk cable 22A.

The sub-power control box 10B contains many switching devices 12a to 12h, DC/DC converters 33, 34 and a 5V power source circuit 36 in addition to a basic power distributing function. Thus, this power distributing circuit can perform on/off switching of powers supplied to respective terminals of the output side connector 13B. In this respect, as the sub-power control box 10B does not contain a unit corresponding to the power source control unit 14, the power distribution circuit 11B contains a circuit (not shown) for decoding and latching data transmitted from the power source control unit 14 via the inter-wiring communication line 22d. That is, the power distribution circuit 11B controls the switching devices 12a to 12h based on data received from the power source control unit 14.

The DC/DC converter 33 has a function of generating an output power of DC 5[V] from the DC input power of 12 or 48[V]. The DC/DC converter 34 has a function of generating an output power of DC 48[V] from the DC input power of 12 [V] or a function of generating an output power of DC 12[V] from the DC input power of 48 [V]. The 5V power source circuit 36 has a function of stabilizing voltage and can output a stable DC power of 5 [V] with a relatively small current.

In this manner, the power distribution circuit 11B also has the functions of performing the voltage conversion and the voltage stabilization as well as the function of distributing power to the plural systems. Further, this power distribution circuit can monitor an output current for each of the systems using the switching devices 12a to 12h and interrupt the output at the time of occurrence of an abnormality in the corresponding output current.

A voltage of power supplied to the sub-power control box 10B from the main power control box 10A via the +B1 power source line 22a or the +B2 power source line 22b of the trunk cable 22A is only one kind of 12 or 48[V]. However, as the power distribution circuit 11B within the sub-power control box 10B contains the DC/DC converters 33, 34 and the 5V power source circuit 36, the sub-power control box 10B can output powers of three kinds of voltage (5, 12, 48[V]) to the respective terminals of the output side connector 13B.

That is, the number of kinds of voltage of power passing the trunk cable 22A is smaller than the number of kinds of voltage of power outputted from the sub-power control box 10B. Thus, even in a case where the sub-power control box 10B outputs various powers of different voltages, the number of the wires constituting the trunk cable 22A can be reduced, and hence an outer diameter of the trunk cable 22A can be made small.

Further, as the voltage (12 or 48[V]) higher than the voltage (5[V]) required for the loads such as the ECUs is supplied to the +B1 power source line 22a of the trunk cable 22A, increase of a current flowing through the +B1 power source line 22a can be suppressed. As a result, the wire of the +B1 power source line 22a can be made thin.

Further, for example, even in a case of supplying only power of 12[V] to the +B1 power source line 22a of the trunk cable 22A, the DC/DC converter 34 within the sub-power control box 10B can boost this voltage and generate voltage of 48 [V]. Thus, as the sub-power control box 10B can supply voltage of 48[V] to the loads connected to the output side connector 13B to thereby suppress an amount of output current, enlargement of the wire harnesses connected to the output side connector 13B can also be suppressed.

The I/O circuit 17B performs a signal processing so that the power distribution circuit 11B can input and output signals. The I/O circuit 17B is connected to the main power control box 10A via the inter-wiring communication line 22d. Switches and so on 24 are connected to the I/O circuit 17B. Thus, the power distribution circuit 11B can input signals from the switches connected to the I/O circuit 17B and perform on/off control of relays and so on connected to the I/O circuit 17B.

Incidentally, it is supposed that each of the switches etc. 23 and the switches etc. 24 may contain switches such as the ignition switch and the accessory switch, the relays driving the respective loads and pilot lamps.

Although the vehicular power distribution system shown in FIG. 1 is constituted of the main power control box 10A, the sub-power control box 10B and the trunk cable 22A, the configuration of the vehicular power distribution system may be changed in such a manner of increasing the number of the sub-power control box. For example, in a case of mounting the sub-power control box 10C as shown in FIG. 4, the vehicular power distribution system may be configured to connect the sub-power control box 100 and the main power control box 10A via the trunk cable 22B.

The features of the embodiment of the vehicular power distribution system according to the invention will be briefly summarized and listed below in (1) to (5).

(1) A vehicular power distribution system which distributes power from a power source (21) to a plurality of systems in a vehicle and then supplies the powers, thus distributed to the plurality of systems, to respective electric devices via predetermined wire harnesses, is configured by including:

a first power control box (main power control box 10A) which is configured to distribute the power;

a second power control box (sub-power control box 10B) which is configured to distribute the power; and a main connection cable (trunk cable 22A) which electrically connects the first power control box (10A) and the second power control box (10B), wherein at least the second power control box (10B) includes at least one voltage converter (DC/DC converters 33, 34, 5V power source circuit 36) which generates output power of second voltage from input power of first voltage determined in advance, and a number of kinds of voltage of power passing the main connection cable (22A) is smaller than each of a number of kinds of voltage outputted from the first power control box (10A) and a number of kinds of voltage outputted from the second power control box (10B).

(2) The vehicular power distribution system describe in (1) is configured in a manner that the first power control box (10A) supplies the power of first voltage to the main connection cable (22A), and the second power control box (10B) receives the power of first voltage from the main connection cable (22A) and generates the output power of second voltage from the voltage converter (DC/DC converters 33, 34, 36) based on the power of first voltage.

(3) The vehicular power distribution system describe in (2) is configured in a manner that the second power control box (10B) includes, as the voltage converter, at least one DC/DC converter (33) which generates the second voltage from the first voltage, and the second voltage lower is than the first voltage.

(4) The vehicular power distribution system describe in (2) is configured in a manner that the second power control box (10B) includes, as the voltage converter, at least one DC/DC converter (34) which generates the second voltage from the first voltage, and the second voltage is higher than the first voltage.

(5) The vehicular power distribution system describe in (1) is configured in a manner that the main connection cable (22A) includes a data communication line (inter-wiring communication line 22d) for transmitting information between the first power control box (10A) and the second power control box (10B), and a control unit (power source control unit 14) provided in one of the first power control box (10A) and the second power control box (10B) controls a state of the other of the first and second power control boxes via the data communication line.

In the vehicular power distribution system having the configuration of (1), even in a case where each of the first and second power control boxes supplies various kinds of voltage to loads, the number of kinds of voltage of power passing the main connection cable can be reduced. Thus, the number of wires constituting the main connection cable can be reduced and enlargement of the wire harnesses can be suppressed. Further, as the voltage converter is provided, power of a relatively high voltage can be passed through the main connection cable. In other words, as a voltage of power passing the main connection cable is high, an outer diameter of the wire harness can be made small by using thin wires.

In the vehicular power distribution system having the configuration of (2), even in a case of connecting a load requiring power of the power source of the second voltage to an output side of the second power control box, the second power control box can generate power of the power source of the second voltage by itself based on power of the first voltage supplied from the main connection cable. In this manner, as power of the power source of the second voltage is not required to be supplied to the main connection cable, the number of wires constituting the main connection cable can be reduced.

In the vehicular power distribution system having the configuration of (3), power of the first voltage higher than the second voltage required for the load can be supplied to the main connection cable. Thus, an amount of voltage drop at the main connection cable can be reduced. In this manner, as the main connection cable can be configured by thin wires, enlargement of the main connection cable can be suppressed.

In the vehicular power distribution system having the configuration of (4), power of the power source of the second voltage higher than the first voltage can be supplied to the load connected to the output side of the second power control box. Thus, a wire connecting between the output side of the second power control box and the load can be made thinner, and enlargement of the wire harnesses can be suppressed.

In the vehicular power distribution system having the configuration of (5), each of the first and second power control boxes can be controlled by providing the control unit, requiring constituent elements such as a microcomputer, only at one of the first and second power control boxes.

In the vehicular power distribution system according to the invention, powers of the power source with more suitable voltages can be supplied to respective various kinds of loads from a power source unit in the vehicle and also enlargement of the wire harnesses can be suppressed.

What is claimed is:

1. A vehicular power distribution system which distributes power from a power source to a plurality of systems in a vehicle and then supplies the powers to a plurality of electric devices via predetermined wire harnesses, comprising:
   a first power control box which is configured to distribute the power;
   a second power control box which is configured to distribute the power; and
   a main connection cable which electrically connects the first power control box and the second power control box, wherein
   the second power control box includes a first voltage converter which generates output power of second voltage lower than a first voltage determined in advance from input power of the first voltage, and a second voltage converter which generates output power of third voltage higher than the first voltage from the input power of the first voltage,
   the first power control box supplies the power of the first voltage to the main connection cable,
   the second power control box receives the power of the first voltage from the main connection cable, and generates the output power of the second and third voltages by the first and second voltage converters based on the power of first voltage, and
   a number of voltage levels of power passing through the main connection cable is smaller than each of a number of voltage levels outputted from the first power control box and a number of voltage levels outputted from the second power control box.

2. The vehicular power distribution system according to claim 1, wherein
   the main connection cable includes a data communication line for transmitting information between the first power control box and the second power control box, and
   a control unit provided in one of the first and second power control boxes controls a state of the other of the first and second power control boxes via the data communication line.

* * * * *